Figure 1:
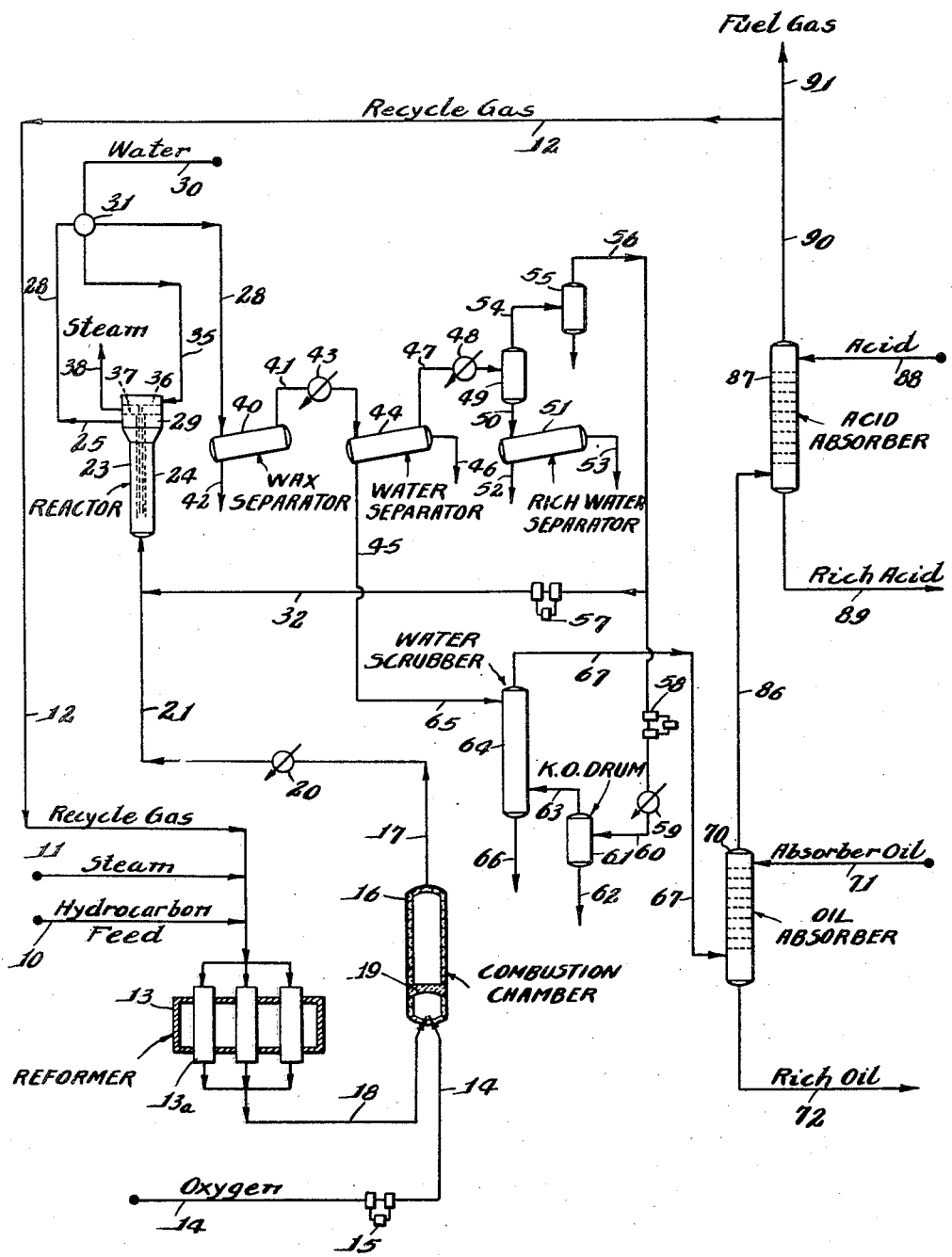

Inventor:
Eric H. Reichl

Patented Nov. 14, 1950

2,529,630

UNITED STATES PATENT OFFICE 2,529,630

PROCESS FOR THE MANUFACTURE OF SYNTHESIS GASES

Eric H. Reichl, Orinda, Calif., assignor to Stanolind Oil and Gas Company, Tulsa, Okla., a corporation of Delaware Application April 25, 1947, Serial No. 743,889

1 Claim. (Cl. 48—215)

This invention relates to hydrocarbon synthesis and it pertains more particularly to an improved method and means for preparing a mixture of hydrogen and carbon monoxide for use as feed in the synthesis of hydrocarbons. More particularly it relates to an improved method and means for producing carbon monoxide and methane in controllable proportions.

This application is a continuation-in-part of my copending application S. N. 619,246, filed September 28, 1945, now abandoned.

Systems have heretofore been proposed for the production of mixtures of hydrogen and carbon monoxide derived from natural gas, but the prior systems have a number of disadvantages among which is the fact that the proportions of hydrogen and carbon monoxide in the produced gas mixture could not be readily controlled when obtaining optimum conversion of methane. One prior art method is to endothermically convert a mixture of carbon dioxide, water and methane; another is to effect partial combustion of methane with oxygen or water. The efficiency of a hydrocarbon synthesis make gas plant employing the partial combustion of methane to produce hydrogen and carbon monoxide is increased with increase in outlet temperature of the gases leaving the combustion chamber but in practice this outlet temperature is limited by the tendency of the hydrocarbons to form free carbon.

It is, therefore, a primary object of this invention of provide method and means for minimizing carbon formation while at the same time permitting the use of optimum temperatures in the combustion zone. Another object of this invention is to provide an improved system for converting hydrocarbon gas, such as natural gas containing methane into normally liquid hydrocarbons. Another object of the invention is to provide a simplified and improved hydrocarbon synthesis employing natural gas as the raw material. Still another object is to provide a system adapted to produce hydrogen and carbon monoxide in selected and variable proportions. A further object is to provide a system of increased carbon efficiency wherein residual gases from the hydrocarbon synthesis proper are converted into synthesis feed. These and other objects of the invention will become apparent as the detailed description thereof proceeds.

Briefly, my invention comprises the preparation of synthesis gas in a multi-stage system. In the first stage recycle gas from a subsequent hydrocarbon synthesis and comprising carbon dioxide and/or water vapor or recycle gas enriched with natural gas are preheated in the presence of catalyst. This is desirable because a much greater amount of heat can be absorbed than is possible in a simple heat exchanger for a given outlet temperature. The partially reformed and preheated products are then supplied to a combustion zone wherein oxygen is added and substantially complete conversion of the hydrocarbons is effected to produce a mixture of hydrogen and carbon monoxide. Since for mechanical reasons, there is a limit to the maximum temperature to which the gases entering the combustion zone can be preheated, the primary effect therefore of the greater absorption of heat in the first stage is that a higher temperature is developed in the combustion zone. This higher temperature and the dilution effect of the recycle gases cooperate to minimize carbon formation.

Figure 2:
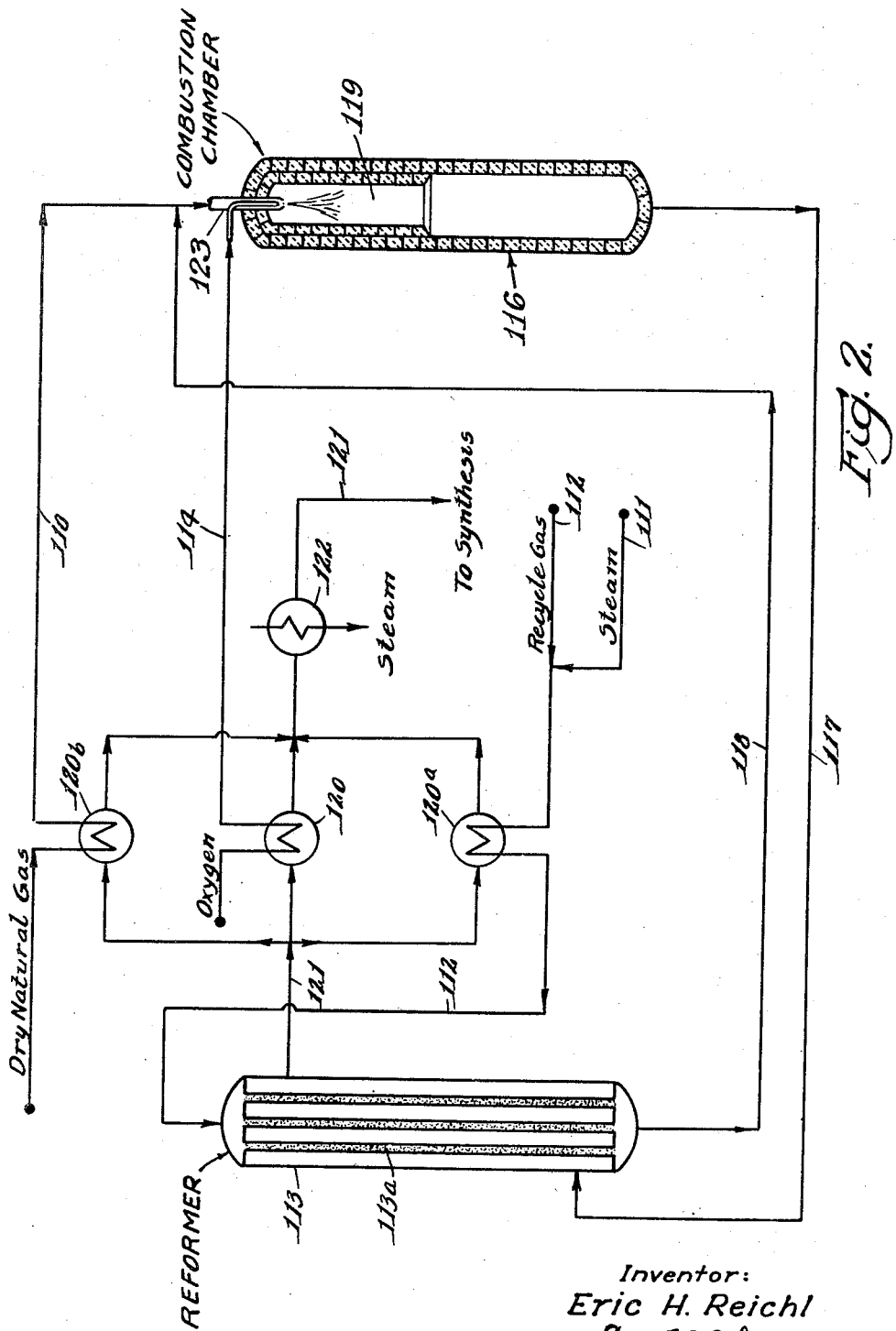

The invention will be more clearly understood from the following detailed description read in conjunction with the accompanying drawings which form a part of the specification and wherein:

Figure 1 is a schematic flow diagram illustrating one embodiment of the invention as applied to a hydrocarbon synthesis operation; and Figure 2 is a diagrammatic showing of the details of a modified gas preparation unit according to this invention.

In these specific examples a system will be described for handling natural gas which consists essentially of methane, although diluent nitrogen may be present. The hydrocarbon feed introduced via line 10 and a controlled amount of water vapor via line 11 are commingled with recycle gas from line 12 and introduced into the furnace 13 at a pressure of about 190 pounds per square inch. The furnace 13 can be operated as a simple preheat zone in the absence of catalyst, wherein the recycle gas, water vapor and hydrocarbon feed are preheated to a temperature of about 1400° F. It should be pointed out that the temperature of this preheating operation is limited by the mechanical strength and by the creeping stress of the available materials of construction. Therefore, in a preferred operation the furnace 13 can be provided with a reformer catalyst in the tubes 13A and in that event partial endothermic conversion of methane is effected at a temperature of between about 1200 and about 1500° F., for example at about 1400° F., and under a pressure of about 190 pounds per square inch. Under these latter conditions between about 10 and about 45% of the methane is consumed by endothermic reactions in the preheat step to produce carbon monoxide and hydrogen.

A preferred reforming catalyst is a Group VIII metal, such as nickel or other metal oxide, which can be either unsupported or supported on clay, Kieselguhr, silica gel, alumina, Super Filtrol, and the like. In either event, the catalyst can be promoted by a metal or metal compound, for example, the oxide of aluminum, magnesium, cerium, uranium, chromium, molybdenum, vanadium, and the like.

Partially reacted and preheated gases from furnace 13 are supplied by line 18 to the combustion chamber 16. These gases, preheated in accordance with this invention, now have a total heat content, in the form of sensible heat and heat derivable therefrom by combustion, greater than the identical gases preheated by the conventional indirect heat exchange method to the same temperature. As pointed out above, this brings about a higher temperature in the combustion zone 16.

Oxygen is supplied via line 14 to the compressor 15 which may be in two or more stages and withdrawn from the compressor 15 at a temperature of about 300° F. and a pressure of about 200 pounds per square inch. This oxygen is then supplied via line 14 to the combustion chamber 16, but may in some instances be further preheated to about 1000° F. before introduction into the combustion chamber 16. The preheated gases from furnace 13, on the other hand, enter the combustion chamber 16 via line 18 at a temperature of between about 1200 and 1500° F. and under a pressure of about 190 pounds per square inch. At the inlet of chamber 16 a muffle can be provided to maintain a zone of substantially higher temperature of between about 2200° F. and 2400° F. In any event, the hot gases from the furnace 13 and oxygen from line 14 are then thoroughly mixed within the combustion chamber 16 where the conversion of methane with carbon dioxide, water vapor and oxygen is effected to produce a gaseous mixture of hydrogen and carbon monoxide, this gas mixture being hereinafter referred to as "synthesis feed gas."

The space velocity through chamber 16 should be sufficient to give a contact time of between about 3 and about 30, for example of between about 5 and 10 seconds. The temperature of this operation is preferably at least about 2100° F. and the outlet pressure may be as high as about 190 pounds per square inch, for example, about 185 pounds per square inch. Carbon formation is negligible under these conditions whereas it is a serious disability in the methods of the prior art wherein oxygen and methane are reacted even at somewhat lower reaction temperatures. This improvement is attributed to the combustion at the higher temperature developed due to the high degree of preheat and to the dilution of the methane with carbon monoxide and hydrogen prior to combustion with oxygen.

The synthesis feed gases withdrawn from the chamber 16 at a temperature of about 2100° F. and a pressure of about 190 pounds per square inch are conducted via line 17 through a cooler or heat exchanger diagrammatically identified by the reference numeral 20. If desired the heat exchanger 20 can be the furnace 13 as described in a second embodiment of this invention which is schematically illustrated in Figure 2. Thus the synthesis feed gas can be passed about the catalyst tubes 13a and withdrawn from the chamber 13 at a substantially reduced temperature. The temperature of the product gases in line 21 can be further cooled below about 600° F. and supplied to the synthesis reactor 23, together with recycle gas supplied via line 22.

The synthesis feed gas after preliminary cooling may be further cooled to about 550° F. or lower in an after-cooler (not shown) in line 21 and introduced into the synthesis reactor 23 together with recycle gas from line 32 where it is exothermically reacted in the presence of a finely divided catalyst maintained in a dense turbulent suspended phase. The catalyst for synthesis reaction can be either of the cobalt type or of the iron type. The cobalt type promotes the reaction:

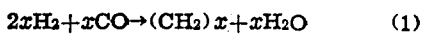

$$2xH_2 + xCO \rightarrow (CH_2)x + xH_2O \qquad (1)$$

and the iron type catalyst promotes the reaction:

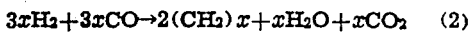

$$3xH_2 + 3xCO \rightarrow 2(CH_2)x + xH_2O + xCO_2 \qquad (2)$$

In either case the catalyst should be in finely divided form so that it can be fluidized by gases or vapors flowing upwardly through the catalyst at low velocity.

The temperature of the synthesis step when employing an iron type catalyst usually is within a range of between about 450 and about 675° F., for example, about 550° F. With a cobalt type catalyst the temperature of the synthesis step is usually within the range of about 225 and 450° F., for example, between about 325 and 395° F. in order to prevent the temperature level of the reactor from gradually increasing, i. e., to remove the heat of exothermic reaction, a plurality of individually controlled bayonet-type cooling tubes 24 may be provided within the mass of turbulent catalyst. The details of the cooling system, however, do not form a part of this invention and will not be described in further detail.

In systems of this type catalyst solids of small particle size are fluidized by upflowing gasiform materials within the reactor so that the catalyst within the reactor is maintained in a turbulent liquid-like dense phase, the extreme turbulence of the suspended catalyst particles serving to maintain substantially the entire mass of catalyst at a uniform temperature. The catalyst particles are of the order of 2 to 200 microns or larger, preferably 20 to 100 microns in particle size. With vertical gasiform fluid velocities of the order of about 0.5 to 5, preferably between about 1 and 4, for example, about 2 feet per second, a liquid-like dense phase of catalyst is obtained in which the bulk density is between about 30 and about 50 per cent, preferably between about 40 and about 80 per cent, e. g., about 60 per cent of the density of the settled catalyst material. The vertical velocity of the gasiform fluids is in any event regulated so as to produce a turbulent suspension of catalyst within the reactor.

An active iron type catalyst can be prepared by a number of methods well known in the art, for example, by oxidizing iron in a stream of oxygen to produce a fused mass and then crushing the fused oxide. A very effective and economical catalyst can be prepared by first roasting iron pyrites. Another catalyst is one of the precipitated type which may be supported on Super Filtrol or other finely divided inert carriers. The iron catalyst, however derived, can be promoted by the addition of between about 0.5 and about 1.5% of a metal alkali compound such as by adsorbing KF thereon before conditioning. The promoted iron catalyst is then treated with hydrogen before use in the synthesis of hydrocarbons.

A preferred technique for preparing catalyst is to roast a material containing a compound of iron with a combustible material or in admixture with a combustible material. The heat of combustion of the combustible components should be sufficient to raise the temperature during the roasting operation to at least 1500° F. Examples of suitable combustible components are sulfur and carbon.

An excellent method of catalyst preparation is to admix hematite ($Fe_2O_3$) with about 2% or more potassium carbonate, heat the mixture to a temperature above 1000° C., i. e., to effect incipient fusing or sintering, and to convert the iron oxide to $Fe_3O_4$, extract excess potassium from the sintered mass with water so that only about 1 to 2%, e. g., about .5% potassium will remain, grind the catalyst to the desired particle size and reduce the $Fe_3O_4$ containing the residual potassium by treatment with hydrogen.

The synthesis gas stream in line 21 is introduced into the reactor 23 at a low point therein preferably through a distributor plate. The reactor 23 comprises an elongated vessel having an enlarged upper section 29 wherein the catalyst settles out from the reaction products by reason of the reduced velocity therein resulting from increased cross section of the vessel and reduction in volume of the feed gases by reaction. The velocity reduction results from the reduction in volume of the reacting gases and from the increased cross sectional area of the reactor 23.

The gasiform product in line 28 is cooled in heat exchanger 31 from a temperature of about 600° F. to about 350° F. at a pressure of about 140 pounds per square inch. The cooled product is introduced into wax separator 40 which likewise is operated at a pressure of about 140 pounds per square inch. Hydrocarbon products boiling below about 350° F. at this pressure are removed from the separator 40 via line 41. The products boiling above about 350° F. at 140 pounds per square inch are withdrawn from the separator 40 via line 42 and comprise essentially waxes.

The gasiform products in line 41 are further cooled in heat exchanger 43 to a temperature of about 20 to 100° F. below the boiling point of water at the partial pressure of water existing in the stream entering the condenser. The mol fraction of the water in the effluent stream 41 will be a function of the gas mixture used as feed, the conversion level, and the product distribution. Ordinarily the mol fraction will be within the range of 0.1 to 0.5.

The cooled mixture is introduced into the water separator 44 and a substantially pure water fraction is removed via line 45. A portion of this water fraction can be used as a scrubber water as described hereinafter or it may be discarded as the net product water. A liquid hydrocarbon fraction is withdrawn from the intermediate separator 44 via line 46 and may comprise substantial amounts of oxygenated compounds.

The gases from gas separator 49 withdrawn via line 54 are introduced into knockout drum 55 preceding the compressors 57 and 58. This knockout drum 55 serves to remove residual condensable hydrocarbons and water as is desirable practice prior to compressing the gases.

The gas stream in line 56 which is removed from knockout drum 55 is split and the separate portions supplied to the compressors 57 and 58. About 50 mol per cent of the gas stream is raised in pressure to about 150 pounds by compressor 57 for internal recycle via line 22 to the hydrocarbon synthesis reactor 23. The remainder of the gas stream is raised in pressure to about 260 pounds per square inch, cooled in cooler 59 to a temperature of about 100° F. and introduced into the knockout drum 61 via line 60. The liquid phase from the knockout drum 61 is withdrawn via line 62 and comprises predominantly water together with some oxygenated compounds and hydrocarbons. The gasiform phase from knockout drum 61 is introduced via line 63 into a water scrubber 64. Scrubbing water is supplied via line 65 and may be derived from water separator 44 and line 45. An aqueous phase comprising oxygenated compounds is withdrawn from the water scrubber 64 via line 66 and may be processed as described in connection with the other water fractions including oxygenated compounds in line 52. The scrubbed reaction products comprising unreacted gases together with hydrocarbons produced in the synthesis are supplied via line 67 to the oil absorber 70.

The product gases in line 67 are introduced into the oil absorber 70 and scrubbed with an absorber oil introduced at about 100° F. through line 71 for the recovery of condensable hydrocarbons. In the oil absorption system a pressure of about 255 pounds per square inch is maintained and about 90 per cent recovery of net pentanes is attained from the rich absorber oil in line 72. The unabsorbed gases which leave the top of the absorber 70 through line 86 can be processed for the recovery of the useful hydrocarbons by absorption or the like and the residual gases recycled via line 12 to the reformer 13. In the illustrated embodiment the gases in line 86 are introduced into acid absorber 87 which is supplied with acid by line 88. Rich acid is withdrawn by line 89 for recovery or conversion of the absorbed hydrocarbons as taught in my copending application Serial No. 619,246. Lean gases are removed overhead via line 90 and may be recycled via line 12 to furnace 13 although a portion may be vented by line 91 to fuel to purge nitrogen from the system.

Referring to Figure 2, a recycle gas fraction including hydrogen, carbon dioxide, a minor proportion of carbon monoxide, water and normally gaseous hydrocarbons is preheated to a temperature of about 1000° F. and supplied via line 112 at about 300 pounds per square inch to an endothermic catalytic reforming zone 113. Extraneous steam can be supplied by line 111.

Catalyst of the type described in connection with Figure 1 is packed in vertically disposed tubes 113a and hot gases are circulated around the tubes to supply the endothermic heat of reforming. The partially reformed gases are withdrawn from the reforming chamber 113 by line 118 at a temperature of about 1500° F. and a pressure of 290 pounds per square inch. These product gases from chamber 113 include increased proportions of carbon monoxide, decreased proportions of carbon dioxide, about the same proportion of hydrogen and a smaller proportion of gaseous hydrocarbons than were supplied to the reformer 113 by line 112. The partially reformed gases in line 118 are commingled with extraneous natural gas supplied by line 110 at a temperature of about 1100° F. and a pressure of about 290 pounds per square inch. This mixture of gases is supplied to the combustion chamber 116 by burner 123. Oxygen, which may likewise be preheated to a temperature of about 1100° F., is introduced to the combustion chamber 116 by line 114 and burner 123 under a pressure of about 290 pounds per square inch. Within the combustion chamber 116 the temperature is maintained between about 1900 and about 2600° F. with an outlet temperature of about 2200° F. in line 117. However, within zone 119 a higher temperature of between about 2200° F. and 2600° F. may be maintained. In this chamber, the oxygen reacts exothermically with a part of the hydrocarbon constituents and provides the heat necessary for the endothermic reaction of the residual hydrocarbons with water and/or carbon dioxide. In some instances it may be desirable to include within chamber 116 a contacting material such as a bed of porous ceramic material but ordinarily such is not the case. Likewise, a checker work muffle or mantle may be provided at the inlet of chamber 116.

The combustion products which are withdrawn from the combustion chamber 116 by line 117 comprise predominantly carbon monoxide and hydrogen with a substantial proportion of water. These hot gases are passed through the shell of reformer 113 and are withdrawn therefrom at a temperature of about 1520° F. and a pressure of about 275 pounds per square inch by line 121. Alternatively, the reformer tubes 113a may be placed within the combustion chamber 116 for the indirect heat exchange with the combustion products.

The product gases in line 121 may be heat exchanged in parallel with the oxygen in line 114, with the extraneous natural gas in line 110, and with the recycle gas in line 112 by exchangers 120, 120a and 120b to effect the desired preheating thereof. The gaseous mixture then can be further cooled for example by a steam generator 122 on line 121 to permit removal of the product water and the dry gas being supplied to the hydrocarbon synthesis proper as described in connection with Figure 1. If desired, a portion of the steam produced in generator 122 can be charged to the reforming system via line 111.

It is also contemplated that in another embodiment of the invention separate mixtures of carbon monoxide and hydrogen may be generated independently in the combustion chamber 116 and reformer 113 operated in parallel and these exothermic and endothermic zones 113 and 116 may be in indirect heat exchange. The products from such parallel combustion and reformer zones can be subsequently mixed selectively to obtain the desired ratio of hydrogen to carbon monoxide suitable for feed in the synthesis of hydrocarbons. About 80 per cent conversion of carbon monoxide per pass can be effected in the synthesis reactor and a portion of the gaseous reactor effluent including unreacted feed can be recycled to the reactor before removal of carbon dioxide. Carbon dioxide can, however, be recovered from the reaction products and portions thereof recycled to the parallel combustion chamber and/or to the reformer furnace. Additional carbon dioxide, together with unreacted feed gas and methane can be recovered from the synthol product beyond the fractionation step and can be recycled to the reformer.

From the above detailed description it will be apparent that the objects of this invention have been accomplished and that a vastly improved system for deriving mixtures of carbon monoxide and hydrogen from light hydrocarbons has been provided.

Although certain preferred embodiments of apparatus and operating conditions have been described to illustrate the invention, it should be understood that various other modifications and operating conditions will be suggested to those skilled in the art without departing from the scope of the invention. Accordingly, the details are not to be construed as limiting the invention and it is intended that the scope of the invention be defined by the appended claim.

What I claim is:

In a process for producing a mixture of carbon monoxide and hydrogen for effecting synthesis with a promoted iron catalyst, the improved method of operation which comprises mixing water vapor with carbon dioxide and methane to form a reformer gas charge, contacting said gas charge with a reforming catalyst in a reforming zone at a temperature in the range of about 1200° to 1500° F. under conditions for converting only about 10% to 45% of said methane endothermically to produce a hot gas mixture containing carbon oxides, hydrogen and unreacted methane, adding both oxygen and additional methane to said hot gas mixture and effecting further conversion in a combustion zone, supplying heat to said combustion zone by partially burning said unconverted and additional methane with said oxygen to maintain combustion temperature in the range of about 1900° F. to 2600° F. and sufficient to effect substantially complete conversion of methane and carbon dioxide into hydrogen and carbon monoxide, supplying the endothermic conversion heat in the reforming zone by indirect contact with hot products produced in said combustion zone, and withdrawing said products for use as synthesis gas after they have been cooled by said indirect contact with the reforming zone.

ERIC H. REICHL.

REFERENCES CITED

The following references are of record in the file of this patent:

UNITED STATES PATENTS

| Number | Name | Date |
| --- | --- | --- |
| 1,847,242 | Guyer et al. | Mar. 1, 1932 |
| 1,929,665 | Wilcox | Oct. 10, 1933 |
| 2,135,058 | Spicer et al. | Nov. 1, 1938 |
| 2,324,172 | Parkhurst | July 13, 1943 |
| 2,347,682 | Gunness | May 2, 1944 |
| 2,381,696 | Shapleigh | Aug. 7, 1945 |